(12) United States Patent
Machida (10) Patent No.: US 6,584,956 B2
(45) Date of Patent: Jul. 1, 2003

(54) APPARATUS AND METHOD FOR CONTROLLING INTERNAL COMBUSTION ENGINE

(75) Inventor: Kenichi Machida, Atsugi (JP)

(73) Assignee: Unisia Jecs Corporation, Kanagawa-ken (JP)

( * ) Notice: Subject to any disclaimer, the term of this patent is extended or adjusted under 35 U.S.C. 154(b) by 138 days.

(21) Appl. No.: 09/925,429

(22) Filed: Aug. 10, 2001

(65) Prior Publication Data

US 2002/0017276 A1 Feb. 14, 2002

(30) Foreign Application Priority Data

Aug. 11, 2000 (JP) ........................................ 2000-245131
Aug. 11, 2000 (JP) ........................................ 2000-245132

(51) Int. Cl.⁷ ................................................. F02P 5/00
(52) U.S. Cl. ............................. 123/406.47; 123/90.15; 123/478
(58) Field of Search ................................. 123/477, 480, 123/406.47, 406.45, 90.15, 90.16, 90.17, 478

(56) References Cited

U.S. PATENT DOCUMENTS

| 5,664,582 A | * | 9/1997 | Szymaitis | 128/898 |
| 5,967,940 A | * | 10/1999 | Yamaguchi | 477/107 |
| 6,047,674 A | * | 4/2000 | Kadowaki et al. | 123/90.15 |
| 6,109,225 A | * | 8/2000 | Ogita et al. | 123/90.15 |
| 6,140,780 A | * | 10/2000 | Oshima et al. | 318/139 |
| 6,158,418 A | * | 12/2000 | Brown et al. | 123/435 |
| 6,196,197 B1 | * | 3/2001 | Yamada et al. | 123/480 |
| 6,302,071 B1 | * | 10/2001 | Kobayashi | 123/90.16 |
| 6,332,448 B1 | * | 12/2001 | Ilyama et al. | 123/304 |

FOREIGN PATENT DOCUMENTS

| JP | 58-206624 | 12/1983 |
| JP | 10-68306 | 3/1998 |
| JP | 11-082077 | 3/1999 |
| JP | 2000-80936 | 3/2000 |
| JP | 2000-104573 | 4/2000 |

* cited by examiner

*Primary Examiner*—John Kwon
(74) *Attorney, Agent, or Firm*—Sughrue Mion, PLLC (57) ABSTRACT

In an electronically controlled fuel injection apparatus of a speed density type, a new air intake efficiency correction value for correcting an intake pressure is calculated based on the intake pressure, an engine rotation speed, and an advance angle amount of valve timing.

20 Claims, 7 Drawing Sheets

APPARATUS AND METHOD FOR CONTROLLING INTERNAL COMBUSTION ENGINE

FIELD OF THE INVENTION

The present invention relates to technology to control an internal combustion engine, based on a new air intake amount, which is equipped with a variable valve operating apparatus for changing opening and closing characteristics of intake and exhaust valves.

RELATED ART OF THE INVENTION

There has been known an electronic controlled fuel injection apparatus called as a speed density type which determines a basic fuel injection quantity based on an engine intake pressure and an engine rotation speed (see Japanese Unexamined Patent Publication No. 58-206624).

Further, there has been known a variable valve operating apparatus which changes opening and closing characteristics of intake and exhaust valves, such as opening and closing timing, a lift amount, an operating angle.

In a variable valve operating apparatus disclosed in Japanese Unexamined Patent Publication No. 10-068306, the opening and closing timing of a valve is advanced or retarded by changing a phase of a camshaft relative to a crankshaft.

In the above electronic controlled fuel injection apparatus of speed density type, the intake pressure is detected as the sum of a new air component pressure and a cylinder residual gas pressure.

Here, in an engine equipped with a variable valve operating apparatus, a cylinder residual gas pressure is changed with a change in opening and closing characteristics of intake and exhaust valves.

As a result, even though the intake pressure is the same, a new air component pressure is changed depending on an operating state of the variable valve operating apparatus. Accordingly, if combining the electronic controlled fuel injection apparatus of speed density type with the engine equipped with the variable valve operating apparatus, then a fuel injection quantity to be calculated based on the intake pressure does not correspond to a new intake air amount, causing a problem in that an air-fuel ratio deviates from a target value.

SUMMARY OF THE INVENTION

The present invention has an object of enabling to accurately detect a new air component pressure (namely, new air intake ratio) even though opening and closing characteristics of intake and exhaust valves are changed, to improve control accuracy of a fuel injection quantity and the like.

To achieve the above object, according to the present invention, the construction is such that, in an internal combustion engine equipped with a variable valve operating apparatus to change opening and closing characteristics of intake and exhaust valves, a new air intake ratio of the engine is calculated based on an intake pressure of the engine, a rotation speed of the engine, and the opening and closing characteristics of the opening and closing valves adjusted by the variable valve operating apparatus, to calculate engine operation factors such as a fuel injection quantity, an ignition timing and the like based on the calculated new air intake ratio.

The other objects and features of this invention will become understood from the following description with reference to the accompanying drawings.

PREFERRED EMBODIMENTS

Figure 1:
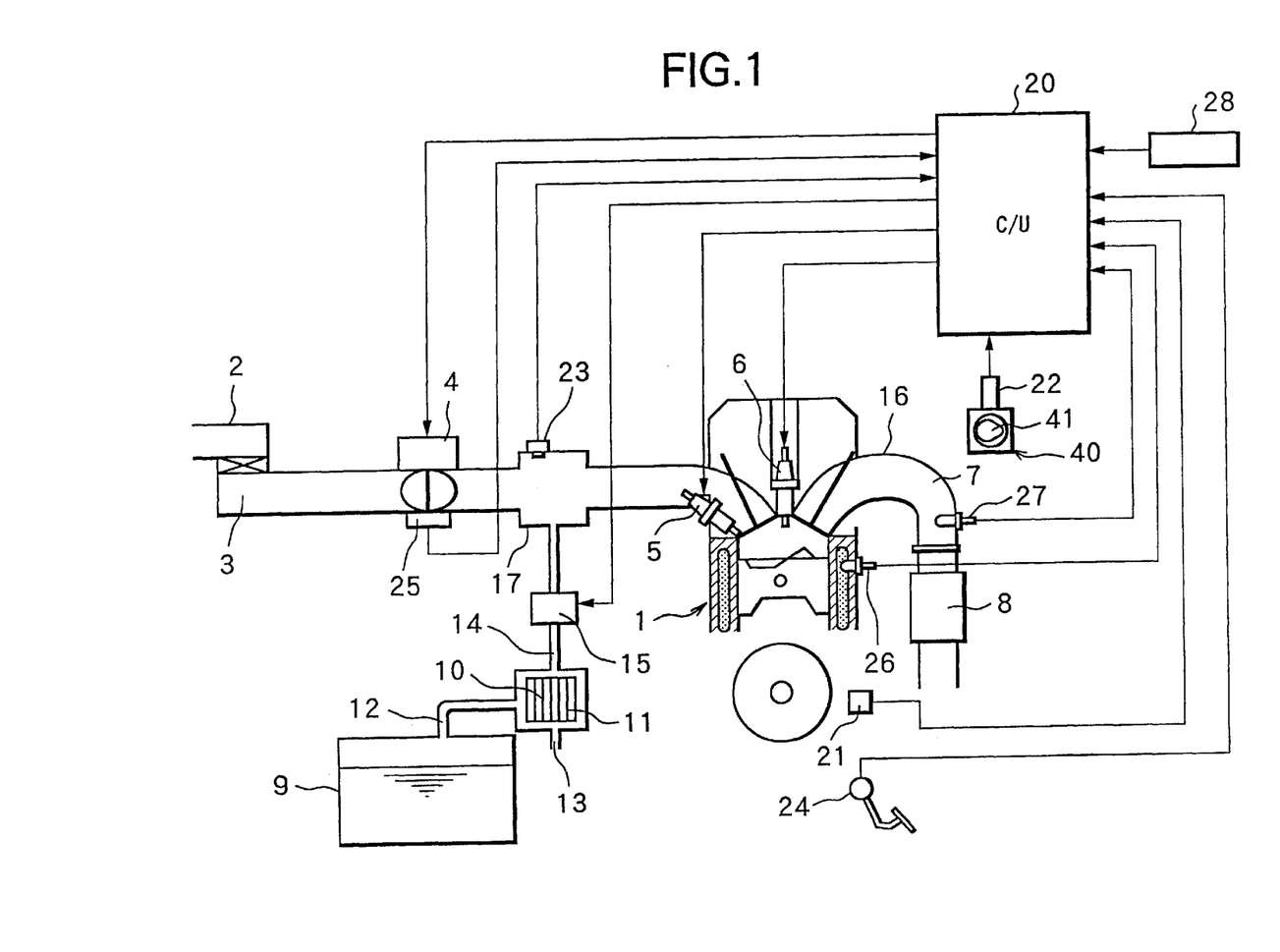
FIG. 1 is a diagram showing a system structure of an internal combustion engine.

FIG. 1 is a diagram showing a system structure of an internal combustion engine for a vehicle.

In FIG. 1, air is sucked into a combustion chamber of each cylinder in an internal combustion engine 1 via an air cleaner 2, an intake passage 3, and an electronic controlled throttle valve 4 driven to open or close by a motor.

The combustion chamber of each cylinder is equipped with an electromagnetic type fuel injection valve 5 for directly injecting fuel into the combustion chamber. Air-fuel mixture is formed in the combustion chamber by the fuel injected from fuel injection valve 5 and the intake air.

Fuel injection valve 5 is opened with power supply to a solenoid thereof by an injection pulse signal output from a control unit 20, to inject fuel adjusted at a predetermined pressure.

The fuel injected from fuel injection valve 5, during intake stroke injection, is diffused into the combustion chamber to form homogeneous air-fuel mixture, and during compression stroke injection, forms stratified air-fuel mixture which concentrates around an ignition plug 6.

The air-fuel mixture formed in the combustion chamber is ignited to burn by ignition plug 6.

Note, internal combustion engine 1 is not limited to the direct injection type gasoline engine but may also be an engine using a fuel injection valve injecting fuel into an intake port.

Exhaust gas from engine 1 is discharged from an exhaust passage 7. A catalytic converter 8 for exhaust purification is disposed in exhaust passage 7.

There is provided a fuel vapor treatment device for performing combustion treatment of fuel vapor generated in a fuel tank 9.

A canister 10 is a closed container which is filled with an adsorbent 11 such as active carbon, and is connected with a fuel vapor inlet pipe 12 extending from fuel tank 9.

Accordingly, the fuel vapor generated in fuel tank 9 is led via fuel vapor inlet pipe 12 to canister 10, and is adsorbed and collected therein.

Moreover, a new air inlet 13 is formed in canister 10 and purge piping 14 leads out from canister 10. A purge control valve 15 which is open/close controlled by means of control signals from control unit 20, is disposed in purge piping 14.

With the above construction, when purge control valve 15 is controlled to open, an intake pressure of engine 1 acts on canister 10.

As a result of intake pressure of engine 1 acting on canister 10, fuel vapor which has been adsorbed in adsorbent 11 of canister 10 is purged by air introduced from the new air inlet 13.

Purged air passes through purge piping 14 and is drawn into intake passage 3 downstream of throttle valve 4, and then burned in the combustion chamber of engine 1.

A variable valve operating apparatus 40 is disposed to an intake side camshaft 41.

Variable valve operating apparatus 40 is to change valve timing of intake valve while keeping an operating angle thereof constant, by changing a phase of camshaft 41 relative to a crankshaft.

When variable valve operating apparatus 40 is operated, the valve timing of intake valve is advanced from the most retarded position at a non-operating time, to increase a valve overlap amount equal to a period in which an opening period of an exhaust valve overlaps with an opening period of an intake valve.

Figure 2:
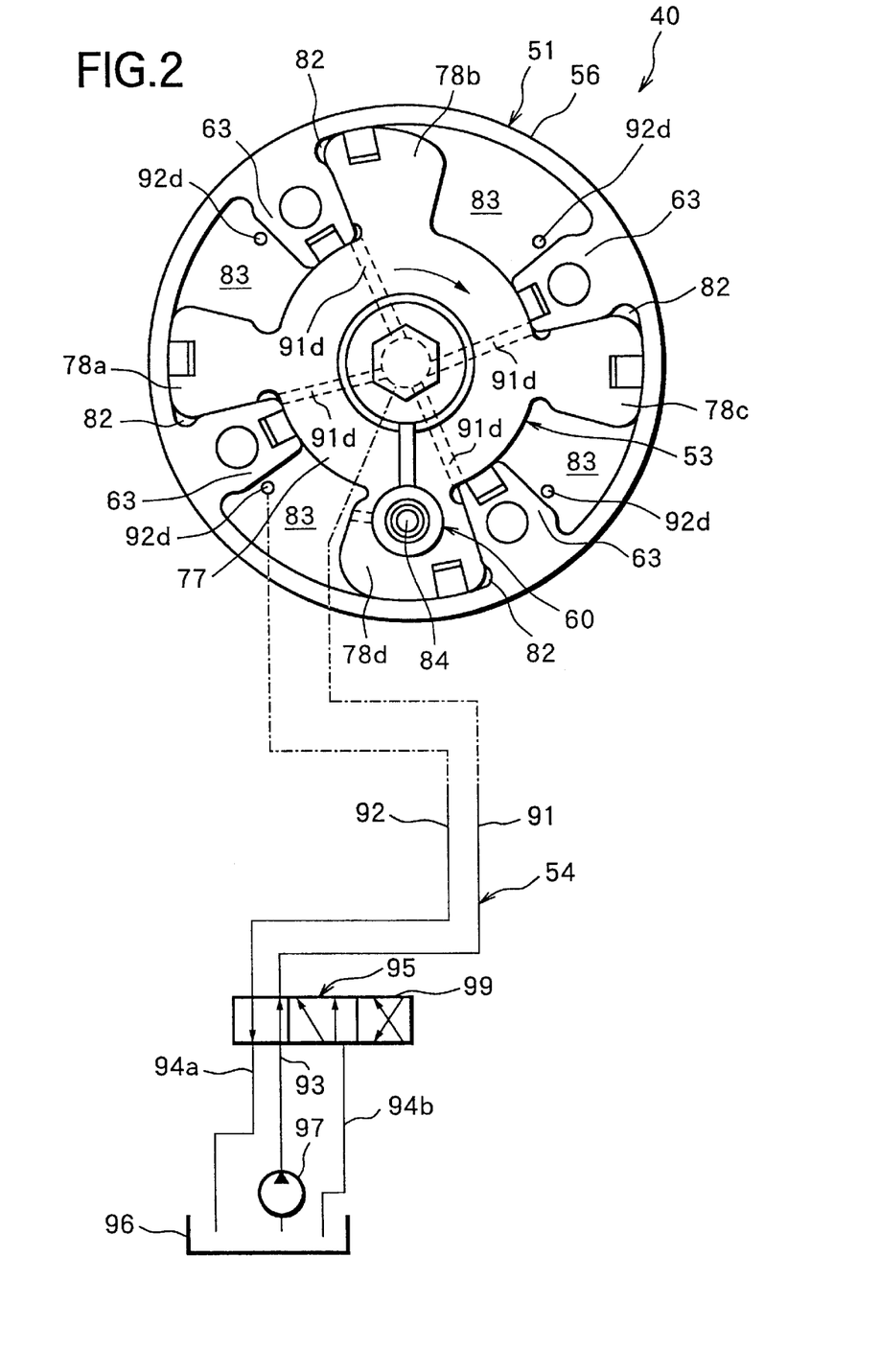
FIG. 2 is a cross section showing a vane type variable valve operating apparatus.

As variable valve operating apparatus 40, there is used a vane type variable valve operating apparatus as shown in FIG. 2.

The vane type variable valve timing control apparatus comprises: a cam sprocket 51 which is rotatably driven by the crankshaft via a timing chain; a rotation member 53 secured to an end portion of camshaft 41 and rotatably housed inside cam sprocket 51; a hydraulic circuit 54 for relatively rotating rotation member 53 with respect to cam sprocket 1; and a lock mechanism 60 for locking a relative rotation position between cam sprocket 51 and rotation member 53 at a predetermined position.

Cam sprocket 51 comprises: a rotation portion having on an outer periphery thereof, teeth for engaging with timing chain; a housing 56 located forward of the rotation portion, for rotatably housing rotation member 53; and a front cover and a rear cover for closing the front and rear openings of housing 56.

Furthermore, housing 56 presents a cylindrical shape formed with both front and rear ends open and with four partition portions 13 protrudingly provided at positions on the inner peripheral face at 90° in the circumferential direction, four partition portions 13 presenting a trapezoidal shape in transverse section and being respectively provided along the axial direction of housing 56.

Rotation member 53 is secured to the front end portion of camshaft 41 and comprises an annular base portion 77 having four vanes 78a, 78b, 78c, and 78d provided on an outer peripheral face of base portion 77 at 90° in the circumferential direction.

First through fourth vanes 78a to 78d present respective cross-sections of approximate trapezoidal shapes. The vanes are disposed in recess portions between each partition portion 13 so as to form spaces in the recess portions to the front and rear in the rotation direction. Advance angle side hydraulic chambers 82 and retarded angle side hydraulic chambers 83 are thus formed between the opposite sides of vanes 78a to 78d and the opposite side faces of respective partition portions 13.

Lock mechanism 60 has a construction such that a lock pin 84 is inserted into an engagement hole at a rotation position on the maximum retarded angle side of rotation member 53.

Hydraulic circuit 54 has a dual system oil pressure passage, namely a first oil pressure passage 91 for supplying and discharging oil pressure with respect to advance angle side hydraulic chambers 82, and a second oil pressure passage 42 for supplying and discharging oil pressure with respect to retarded angle side hydraulic chambers 83.

To these two oil pressure passages 41 and 42 are connected a supply passage 93 and drain passages 94a and 94b, respectively, via an electromagnetic switching valve 95 for switching the passages.

An engine driven oil pump 97 for pumping oil inside an oil pan 96 is provided in supply passage 93, and the downstream ends of drain passages 94a and 94b are communicated with oil pan 46.

First oil pressure passage 91 is formed substantially radially in base 27 of rotation member 53, and connected to four branching paths 91d communicating with each hydraulic chamber 82 on the advance angle side. Second oil pressure passage 92 is connected to four oil galleries 92d opening to each hydraulic chamber 83 on the retarded angle side.

With electromagnetic switching valve 95, an internal spool valve is arranged so as to control relative switching between respective oil pressure passages 91 and 92, and supply passage 93 and first and second drain passages 94a and 9b.

Control unit 20 controls the energizing quantity for an electromagnetic actuator 99 based on a duty control signal superimposed with a dither signal.

For example, when a control signal of duty ratio 0% is output from control unit 20 to electromagnetic actuator 99, the hydraulic fluid pumped from oil pump 47 is supplied to retarded angle side hydraulic chambers 83 via second oil pressure passage 92, and the hydraulic fluid inside advance angle side hydraulic chambers 82 is discharged to inside oil pan 96 from first drain passage 94a via the first oil pressure passage 91.

Consequently, the pressure inside retarded angle side hydraulic chambers 83 becomes a high pressure while the pressure inside advance angle side hydraulic chambers 82 becomes a low pressure, and rotation member 53 is rotated to the full to the retarded angle side by means of vanes 78a to 78d. The result of this is that the opening timing for the intake valves is delayed, and the overlap with the exhaust valves is thus reduced.

On the other hand, when a control signal of a duty ratio 100% is output from control unit 20 to electromagnetic actuator 99, the hydraulic fluid is supplied to inside advance angle side hydraulic chambers 82 via first oil pressure passage 91, and the hydraulic fluid inside retarded angle side hydraulic chambers 83 is discharged to oil pan 96 via second oil pressure passage 92, and second drain passage 94b, so that retarded angle side hydraulic chambers 83 become a low pressure.

Therefore, rotation member 53 is rotated to the full to the advance angle side by means of vanes 78a to 78d. Due to this, the opening timing for the intake valve is advanced (advance angle) and the overlap with the exhaust valve is thus increased.

Moreover, control unit 20 sets by proportional, integral and derivative control action, a feedback correction amount PIDDTY for making a detection value of rotation phase of cam sprocket 51 and the camshaft coincide with a target value set corresponding to the operating conditions. Control unit 20 then makes the result of adding a predetermined base duty ratio BASEDTY to the feedback correction amount PIDDTY a final duty ratio VTCDTY, and outputs the control signal for the duty ratio VTCDTY to electromagnetic actuator 99.

In the case where it is necessary to change the rotation phase in the retarded angle direction, the duty ratio is reduced by means of the feedback correction amount PIDDTY, so that the hydraulic fluid pumped from oil pump 97 is supplied to retarded angle side hydraulic chambers 83, and at the same time the hydraulic fluid inside advance angle side hydraulic chambers 82 is discharged to inside oil pan 46.

Conversely, in the case where it is necessary to change the rotation phase in the advance angle direction, the duty ratio is increased by means of the feedback correction amount PIDDTY, so that the hydraulic fluid is supplied to inside advance angle side hydraulic chambers 82, and at the same time the hydraulic fluid inside retarded angle side hydraulic chambers 83 is discharged to oil pan 46.

Furthermore, in the case where the rotation phase is maintained in the current condition, the absolute value of the feedback correction amount PIDDTY decreases to thereby control so as to return to a duty ratio close to the base duty ratio.

Variable valve operating apparatus 40 is not limited to the above vane type variable valve operating apparatus, but there may be adopted a different type of a variable valve operating apparatus to change valve timing.

Also, there may be adopted a variable valve operating apparatus for changing valve lift and/or an operating angle with or without change of valve timing.

Moreover, variable valve operating apparatus 40 may be constructed to change opening and closing characteristics of the exhaust valve in place of or as well as the intake valve.

Control unit 20 is equipped with a microcomputer including a CPU, a ROM, a RAM, an A/D converter, an input/output interface and so forth. Control unit 20 receives signals from various sensors to perform calculations based on these signals, thereby controlling operations of fuel injection valve 5, ignition plug 6, purge control valve 15, variable valve operating apparatus 40 and the like.

The various sensors include a crank angle sensor 21 for detecting a crank angle of engine 1 and a cam sensor 22 for taking a cylinder discrimination signal out of the camshaft. The rotation speed Ne of engine is calculated based on a signal from crank angle sensor 21.

In addition, there is provided an intake pressure sensor 23 for detecting an intake pressure of engine 1 in an intake collector portion 17, an acceleration sensor 24 for detecting a depressed amount APS of an accelerator pedal, a throttle sensor 25 for detecting an opening degree TVO of throttle valve 4, a water temperature sensor 26 for detecting a cooling water temperature Tw of engine 1, an air-fuel ratio sensor 27 for detecting an air-fuel ratio of a combustion mixture corresponding to an oxygen concentration of exhaust, and a vehicle speed sensor 28 for detecting a vehicle speed VSP.

Control unit 20 calculates a basic fuel injection quantity corresponding to the new air intake amount based on the engine rotation speed Ne to be calculated based on an intake pressure PB detected by intake pressure sensor 23 and a signal from crank angle sensor 21, and controls fuel injection valve 5 corresponding to the basic fuel injection quantity.

More specifically, a basic fuel injection quantity Tp is calculated based on a constant KCOND, the intake pressure PB, a new air intake efficiency correction value PIEGR, and an intake air temperature correction value KTAHOS as follows.

$$Tp = KCOND \times (PB - PIEGR) \times KTAHOS$$

The new air intake efficiency correction value PIEGR corresponds to a cylinder residual gas pressure which changes with a new air intake ratio out of the intake pressure to be detected by intake pressure sensor 23, and a new air component pressure is obtained as PB−PIEGR.

Figure 3:
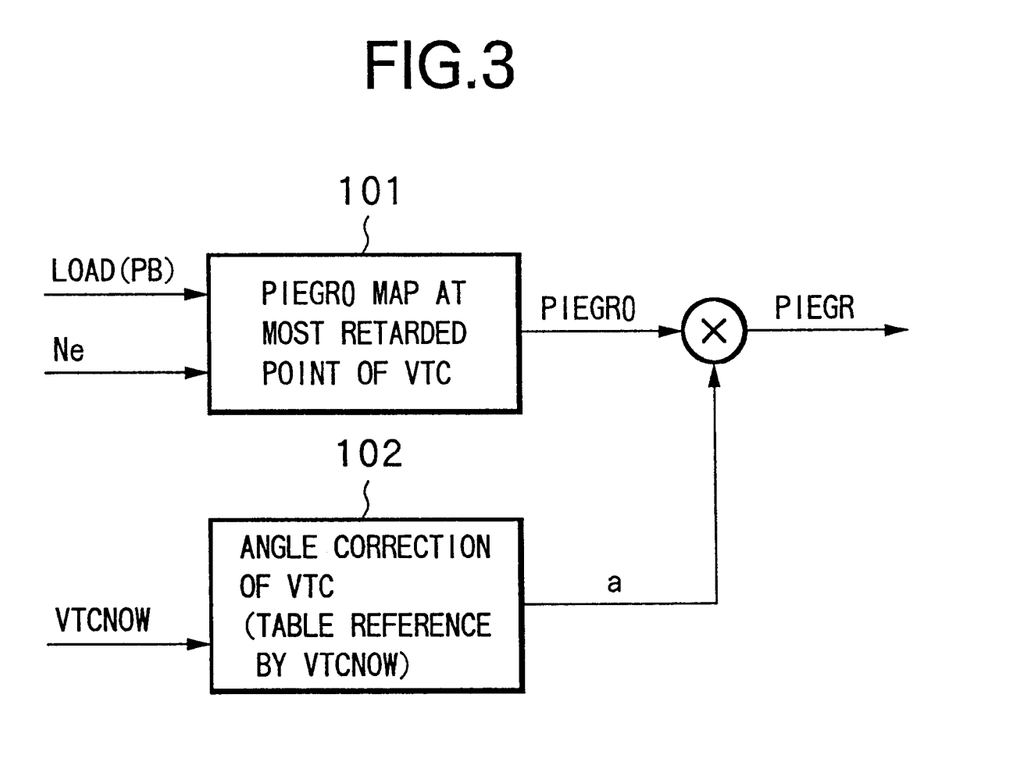
FIG. 3 is a block diagram showing a first embodiment of a correction calculation process based on a new air intake ratio.

The new air intake efficiency correction value PIEGR is calculated as shown in FIG. 3.

In FIG. 3, the intake pressure PB to be detected by intake pressure sensor 23 and the engine rotation speed Ne are input to a most retarded correction value calculation unit 101.

Most retarded correction value calculation unit 101 is provided with a map for, in advance, memorizing a new air intake efficiency correction value PIEGR0 at the most retarded point corresponding to the intake pressure PB and engine rotation speed Ne, and by referring to the map, the new air intake efficiency correction value PIEGR0 corresponding to the intake pressure PB and engine rotation speed Ne at that time is retrieved.

The new air intake efficiency correction value PIEGR0 is set based on the new air intake ratio for each engine operating condition estimated from the intake pressure PB and engine rotation speed Ne, provided that variable valve operating apparatus 40 is held in a non-operating state and valve timing of the intake valve is fixed at the most retarded position as a reference opening and closing characteristic.

The map retrieval process in most retarded correction value calculation unit 101 unifies both of processes for calculating a reference new air intake ratio corresponding to the non-operating state of variable valve operating apparatus 40 and determining the new air intake efficiency correction value PIEGR0 from this reference new air intake ratio.

Accordingly, the calculation of reference new air intake ratio and the calculation of new intake efficiency correction value PIEGR0 can be processed separately.

On the other hand, a detection value VTCNOW of an advance amount in valve timing to be controlled by variable valve operating apparatus 40 is input to a correction value by a VTC angle calculation unit 102.

The detection value VTCNOW is obtained as an angle phase difference between a detection signal from cam sensor 22 and a detection signal from crank angle sensor 21, and the most retarded position in the non-operating state of variable valve operating apparatus 40 is indicated by 0°, so that an advance amount from the most retarded position can be obtained as the detection value VTCNOW.

Correction value calculation unit 102 is provided with a map for, in advance, storing a correction coefficient "a" for correcting the new air intake efficiency correction value PIEGR0 corresponding to the advance amount VTCNOW, and the correction coefficient a corresponding to the advance amount VTCNOW at that time is retrieved from the map.

The map of the correction coefficient "a" is set corresponding to a change in cylinder residual gas pressure due to a change in the advance amount VTCNOW. The new air intake efficiency correction value PIEGR0 is increasingly corrected at an advance amount in which the cylinder residual gas pressure becomes larger than at the most retarded point, and decreasingly corrected at an advance amount in which the cylinder residual gas pressure becomes smaller than at the most retarded point.

The correction coefficient "a" is multiplied by the new air intake efficiency correction value PIEGR0 and the multiplication result is output as a final new air intake efficiency correction value PIEGR (new air intake ratio) and based on the new air intake efficiency correction value PIEGR is calculated a basic fuel injection quantity Tp.

As described above, in case the new air intake efficiency correction value PIEGR0 to be calculated corresponding to the most retarded point of valve timing is corrected based on the advance amount VTCNOW at that time, even if the valve timing is changed by variable valve operating apparatus 40, the new air intake efficiency correction value PIEGR can be set as a value adapted to the valve timing at that time, thereby enabling to set a fuel injection quantity equivalent to an actual intake new air component pressure and to maintain air-fuel ratio control accuracy.

For example, in case ignition timing is calculated based on the intake pressure PB and the engine rotation speed Ne, a correction coefficient of the ignition timing is calculated from the new air intake efficiency correction value PIEGR, and the ignition timing obtained from the intake pressure PB and the engine rotation speed Ne may be corrected and set with the correction coefficient. The intake pressure PB detected by intake pressure sensor 23 is decreasingly corrected by the new air intake efficiency correction value PIEGR and the ignition timing is calculated based on the intake pressure PB after the correction.

In calculating the new air intake efficiency correction value PIEGR0, a correction by a back pressure or an atmosphere pressure may be made.

In case variable valve operating apparatus 40 makes a valve lift variable, the new air intake efficiency correction value PIEGR0 is calculated corresponding to a new air intake ratio at a reference valve lift amount, and a correction corresponding to a change in cylinder residual gas pressure caused by a change in valve lift amount is made to the new air intake efficiency correction value PIEGR0.

Figure 4:
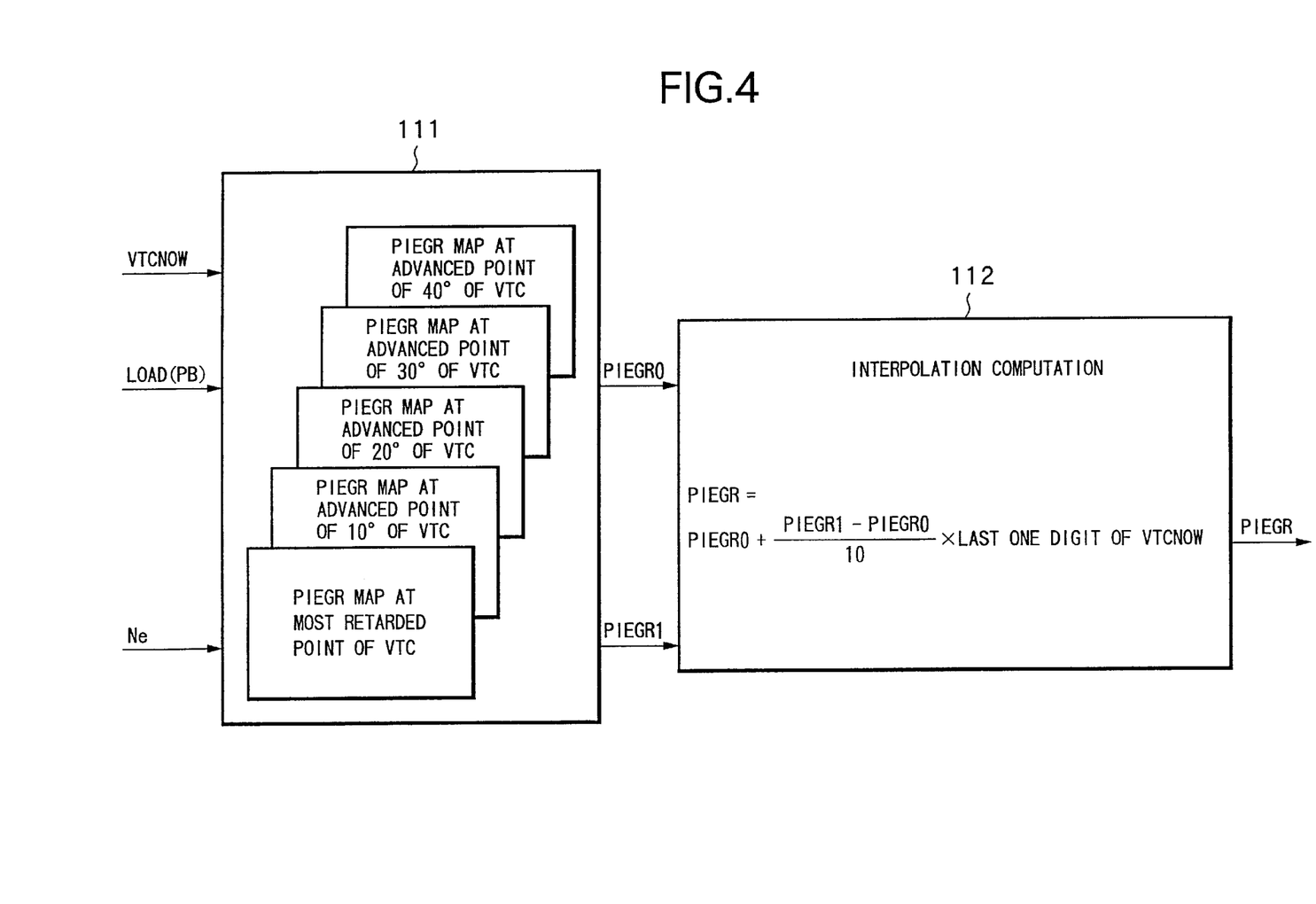
FIG. 4 is a block diagram showing a second embodiment of the correction calculation process based on a new air intake ratio.

FIG. 4 shows a second embodiment of the calculation process of new air intake efficiency correction value PIEGR.

A map correction value retrieval unit 111 is input with the intake pressure PB, the engine rotation speed Ne, and the advance amount VTCNOW. Further, map correction value retrieval unit 111 is provided with, in addition to a map adapted to the most retarded angle, maps adapted respectively to each 100 valve timing, that is advance amount=10°, 20°, 30°, 40° . . . , as a map for storing the new air intake efficiency correction value PIEGR corresponding to the intake pressure PB and the engine rotation speed Ne.

By referring to two maps corresponding to the advance amounts before and after the input advance amount VTCNOW, the retrieval result from each map is output as PIEGR0 and PIEGR1 For example, when the input advance amount VTCNOW is 22°, the map adapted to the advance amount of 20° and the map adapted to the advance amount of 30° are referred to, and each retrieval result is output as PIEGR0 and PIEGR1.

Further, for example, when the input advance amount VTCNOW is 30°, the map adapted to the advance amount of 30° and the map adapted to the advance amount of 40° are referred to, and each retrieval result is output as PIEGR0 and PIEGR1.

The new air intake efficiency correction values PIEGR0 and PIEGR1 are input to an interpolation calculation unit 112.

In interpolation calculation unit 112, the new air intake efficiency correction value PIEGR corresponding to the advance amount VTCNOW at that time is obtained by a linear interpolation according to the following equation.

$$PIEGR = PIEGR0 + \text{last one digit of } VTCNOW \times (PIEGR1 - PIEGR0)/10.$$

The map is not limited to be adapted to each 10°, but an interval between advance amounts can be set at other than 10°.

Moreover, the interval between advance amounts can be set to be unequal.

In case the interval between advance amounts is set at other than 10°, the denominator 10 of the above equation is changed in conformity with a difference between the advance amounts each of which the map is adapted to.

The correction by the back pressure or the atmosphere pressure is made to the new air intake efficiency correction value PIEGR obtained from the interpolation calculation.

When the new air intake efficiency correction value PIEGR0 at the most retarded point is corrected using the correction coefficient "a", since the correction based on the advance amount VTCNOW is constant regardless of the engine operating condition, it is impossible to cope with different correction requirements for each engine operating condition.

However, as described above, when correlation between the engine operating condition and the appropriate new air efficiency correction value PIEGR is stored for each of a plurality of advance amounts VTCNOW, the correction corresponding to a change in advance amount VTCNOW and different engine operating conditions can be made.

By using the interpolation calculation, while limiting the number of maps to be stored, the new air intake efficiency correction value PIEGR corresponding to the change in advance amount VTCNOW and the different engine operating conditions can be obtained, so that the storage capacity and adaptation man-hour of a map can be cut down.

When the new air intake efficiency correction value PIEGR corresponding to the engine operating condition is not increased evenly or decreased evenly corresponding to an increase in advance amount VTCNOW, the accuracy of interpolation calculation is deteriorated.

Therefore, it is preferable that a map is set corresponding to the advance amount VTCNOW in which the new air intake efficiency correction value PIEGR reaches an inflection point and /or an extreme (maximum value or minimum value) with respect to the change in advance amount VTCNOW. Or, it is preferable that, by curve interpolating based on the new air intake efficiency correction value PIEGR obtained from three or more maps in the vicinity of the advance amount VTCNOW in which the new air intake efficiency correction value PIEGR reaches the inflection point and /or the extreme, the new air intake efficiency correction value PIEGR corresponding to the advance amount VTCNOW at that time is obtained.

Figure 5:
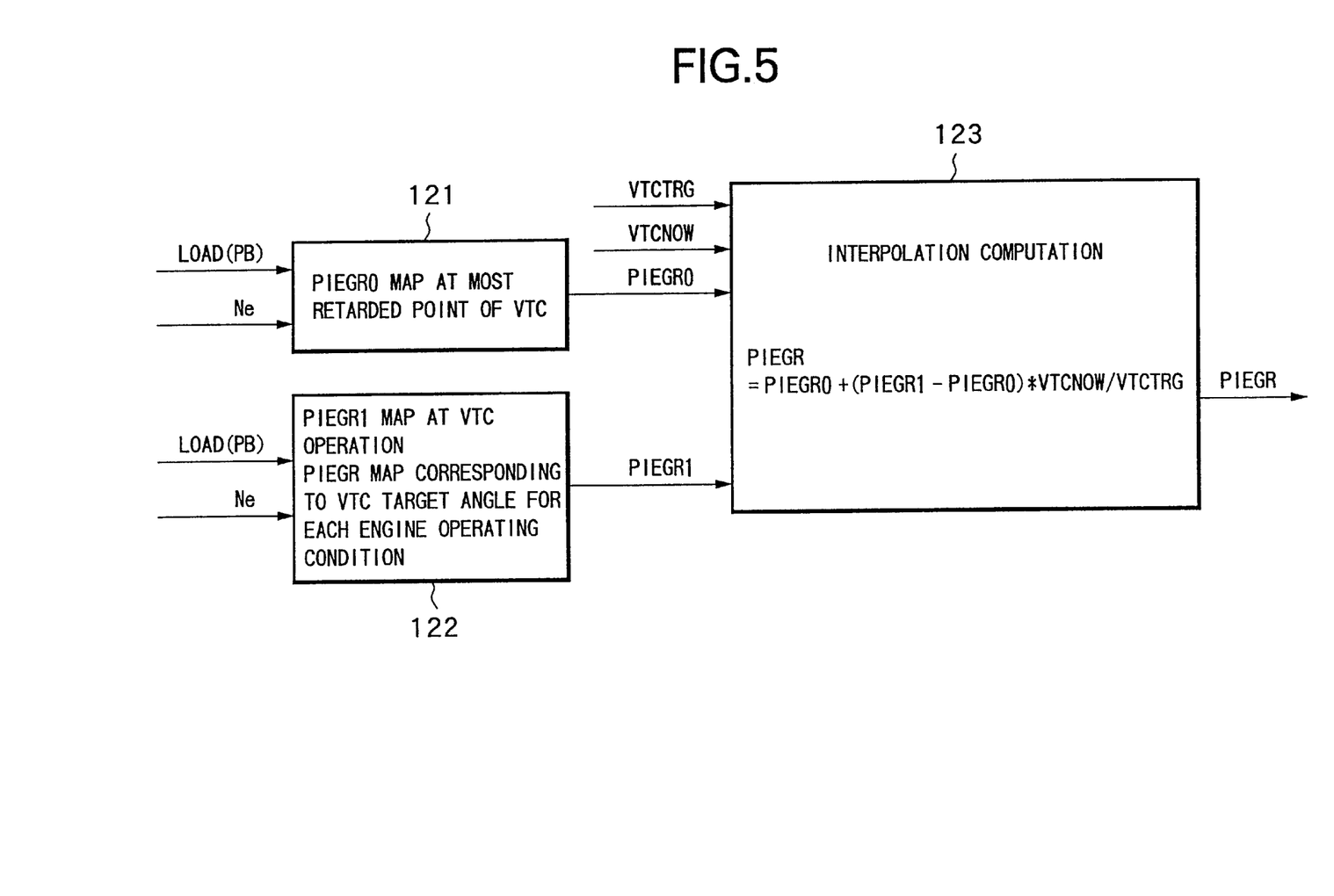
FIG. 5 is a block diagram showing a third embodiment of the correction calculation process based on a new air intake ratio.

FIG. 5 shows a third embodiment of calculation process of the new air intake efficiency correction value PIEGR.

In FIG. 5, a most retarded correction value calculation unit 121 is equipped with a most retarded map for, in advance, storing a new air intake efficiency correction value PIEGR0 at the most retarded angle point corresponding to the intake pressure PB and the engine rotation speed Ne.

By referring to the most retarded point map, the new air intake efficiency correction value PIEGR0 corresponding to the intake pressure PB and the engine rotation speed Ne at that time is retrieved.

The map shows a change in new air intake ratio due to a change in engine operating condition with the valve timing being fixed at the most retarded.

On the other hand, a target advance amount based correction value calculation unit 122 is equipped with a map for storing a new air intake efficiency correction value PIEGR1 corresponding to a target advance amount VTCTRG of variable valve operating apparatus 40 to be corresponding to the intake pressure PB and the engine rotation speed Ne. By referring to the map, a new air intake efficiency correction value PIEGR1 corresponding to the intake pressure PB and the engine rotation speed Ne at that time is retrieved.

The map shows the new air intake ratio for each operating state, in a state in which the valve timing is controlled to the target advance amount corresponding to the engine operating condition at that time.

An interpolation calculation unit 123 is input with the new air intake efficiency correction value PIEGR0, the new air intake efficiency correction value PIEGR1, the target advance amount VTCTRG, and an actual advance amount VTCNOW, and, by an interpolation calculation based on these values, obtains the new air intake efficiency correction value PIEGR corresponding to the actual advance amount VTCNOW at that time.

The actual advance amount VTCNOW is obtained as an angle phase difference between a detection signal from cam sensor 22 and a detection signal from crank angle sensor 21. A most retarded position that is within the non-operating state of variable valve operating apparatus 40 is indicated by 0°, and an advance amount from the most retarded position is obtained as VTCNOW.

The interpolation calculation is carried out according to the following equation.

$$PIEGR=PIEGR0+(PIEGR1-PIEGR0)\times VTCNOW/VTCTRG.$$

According to the above calculation, if VTCNOW/VTCTRG showing a convergence ratio to the target VTCTRG of actual advance amount VTCNOW is "1" being equal to the target VTCTRG, PIEGR=PIEGR1.

On the other hand, since the actual advance amount VTCNOW is delayed in response to a change in target advance amount VTCTRG, if the target advance amount VTCTRG is increasingly changed, the convergence ratio VTCNOW/VTCTRG becomes less than 1 temporarily. Therefore, this VTCNOW/VTCTRG is multiplied to PIEGR1−PIEGR0 to obtain the correction value PIEGR corresponding to the actual advance amount VTCNOW by the linear interpolation.

As described above, when the correction value PIEGR at the actual advance amount VTCNOW is obtained by the linear interpolation based on the correction value PIEGR1 at the target advance amount VTCTRG and the correction value PIEGR0 at the most retarded point, an appropriate correction value PIEGR can be set in response to the switching of the target advance amount VTCTRG of variable valve operating apparatus 40 and also a correction value PIEGR can be set corresponding to the actual advance amount VTCNOW even at a transient change point of the valve timing, so that a fuel injection quantity corresponding to an actual intake new air component pressure can be set to maintain air-fuel ratio control accuracy.

Further, in case the ignition timing is calculated based on the intake pressure PB and the engine rotation speed Ne, a correction coefficient of the ignition timing may be calculated from the new air intake efficiency correction value PIEGR, to correct and set the ignition timing obtained from the intake pressure PB and the engine rotation speed Ne by the correction coefficient. The intake pressure PB detected by intake pressure sensor 23 is decreasingly corrected by the new air efficiency correction value PIEGR, and the ignition timing is calculated based on the intake pressure PB after the correction.

In case variable valve operating apparatus 40 makes the valve lift variable, a new air intake efficiency correction value PIEGR0 where the valve lift is fixed at a reference valve lift amount and also a new air intake efficiency correction value PIEGR1 where the valve lift is at a target valve lift amount are calculated, to obtain the new air intake efficiency correction value PIEGR corresponding to an actual valve lift amount by the linear interpolation with these calculation results and a convergence ratio of the valve lift amount.

The correction by the back pressure and the atmosphere pressure may be made on the new air intake efficiency correction value PIEGR.

In case the correction value PIEGR corresponding to the actual operating state of variable valve operating apparatus 40 is obtained by the linear interpolation as mentioned in the above, if the correction value PIEGR has an inflection point or an extreme (maximum value or minimum value) to a change in the operating state of variable valve operating apparatus 40, the accuracy of the linear interpolation is deteriorated.

Therefore, a forth embodiment will be explained according to FIG. 6, wherein a correction value PIEGR is calculated so as to cope with a case where the correction value PIEGR has the inflection point or the extreme (maximum value or minimum value).

Figure 6:
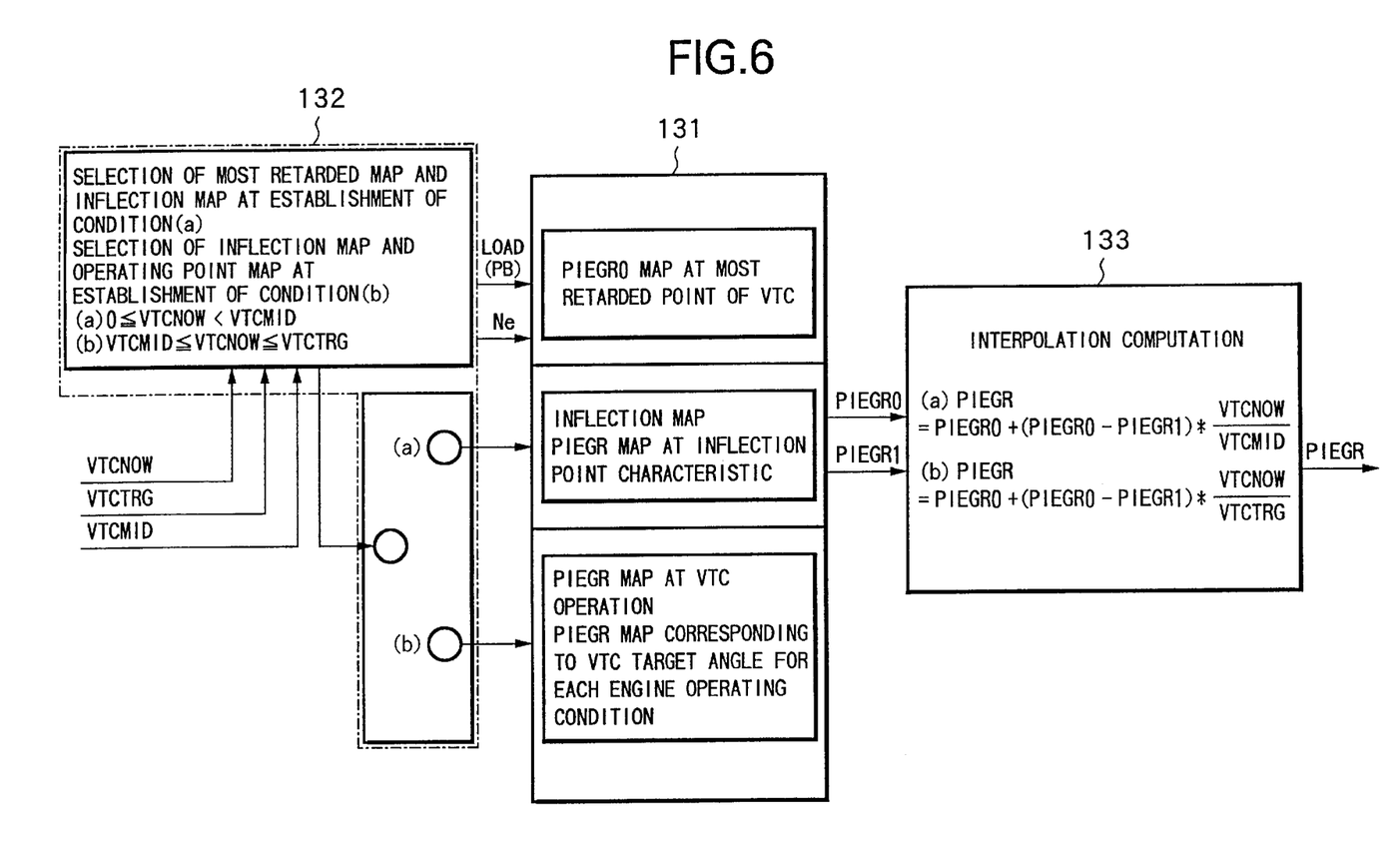
FIG. 6 is a block diagram showing a fourth embodiment of the correction calculation process based on a new air intake ratio.

In FIG. 6, a map correction value calculation unit 131 is provided with a retarded point map for storing the new air intake efficiency correction value PIEGR at the most retarded point similar to the retarded point map provided in correction calculation value unit 101, a target advance point map for storing the new air efficiency correction value PIEGR corresponding to the target advance amount VTCTRG for each engine operating condition similar to the map provided in the target point correction value calculation unit 102, and an inflection point map for storing the correction value PIEGR at an advance amount VTCMID at which the correction value PIEGR reaches the inflection point with respect to the change in advance amount for each operating condition.

In this embodiment, one inflection point map is provided assuming that the correction value PIEGR (new air intake ratio) has one inflection point with respect to the advance amount change.

At a map selection unit 132, two maps to be used for linear interpolation are selected out of the most retarded point map, the target advance point map, and the inflection map.

More specifically, when the following condition "a" is established, the most retarded point map and the inflection point map are selected, while when the following condition "b" is established, the inflection point map and the target advance point map are selected.

a: $0 \leq VTCNOW < VTCMID$.

b: $VTCMID \leq VTCNOW \leq VTCTRG$.

Namely, when the actual advance amount VTCNOW is in the range of from the most retarded state "0" to the inflection point, the correction value PIEGR corresponding to the actual advance amount VTCNOW is obtained by the linear interpolation from the correction value PIEGR corresponding to the most retarded state and the correction value PIEGR corresponding to the advance amount VTCMID of the inflection point.

Further, when the target advance amount VTCTRG is larger than the advance amount VTCMID of the inflection point and the actual advance amount VTCNOW is between the advance amount VTCMID and the target advance amount VTCTRG, the correction value PIEGR corresponding to the actual advance amount VTCNOW is obtained by the linear interpolation from the correction value PIEGR corresponding to the advance amount VTCMID of the inflection point and the correction value PIEGR corresponding to the target advance amount VTCTRG.

The map selection result at map selection unit 112 is output to map correction value calculation unit 131, and respectively from the selected maps, the correction value PIEGR0 and the correction value PIEGR1 corresponding to the load (PB) and the engine rotation speed Ne at that time are retrieved to be output.

When the most retarded point map and the inflection point map are selected, the retrieval result of the most retarded point map is output as PIEGR0 and the retrieval result of the inflection point map is output as PIEGR1. On the other hand, when the inflection point map and the target advance point map are selected, the retrieval result of the inflection point map is output as PIEGR0 and the retrieval result of the target advance point map is output as PIEGR1.

The correction values PIEGR0 and PIEGR1 output from map correction value calculation unit 131 are input to an interpolation calculation unit 133. In Interpolation calculation unit 133, one of the following interpolation calculation equation is selected depending on which of the conditions "a" or "b" is established, that is, on which maps are selected, to obtain the correction value PIEGR corresponding to the actual advance angle amount VTCNOW by the linear interpolation.

On condition "a" established (selection of most retarded angle point map and inflection point map)

$$PIEGR=PIEGR0+(PIEGR1-PIEGR0)\times VTCNOW/VTCMID.$$

On condition "b" established (selection of inflection point map and target advance amount point map)

$$PIEGR=PIEGR0+(PIEGR1-PIEGR0)\times VTCNOW/VTCTRG.$$

Also, in case the correction value PIEGR has one extreme (maximum value or minimum value) with respect to the change in advance amount, the correction value PIEGR corresponding to the actual advance amount VTCNOW can be obtained by the linear interpolation as same as above.

In case the correction value PIEGR with respect to the change in advance amount has a plurality of inflection points and/or extremes (maximum value or minimum value), there is provided a map for storing a correction value for each advance amount VTCMID as the inflection point or the extreme, thereby enabling to maintain the calculation accuracy of the linear interpolation. Further, the correction value PIEGR corresponding to the actual advance amount VTCNOW may be obtained by the curve interpolation based on the correction values retrieved from three or more maps.

Next, a fifth embodiment to obtain the correction value PIEGR corresponding to the actual advance amount VTCNOW by correcting a phase delay to the correction value PIEGR corresponding to the target advance amount VTCTRG will be explained according to FIG. 7.

Figure 7:
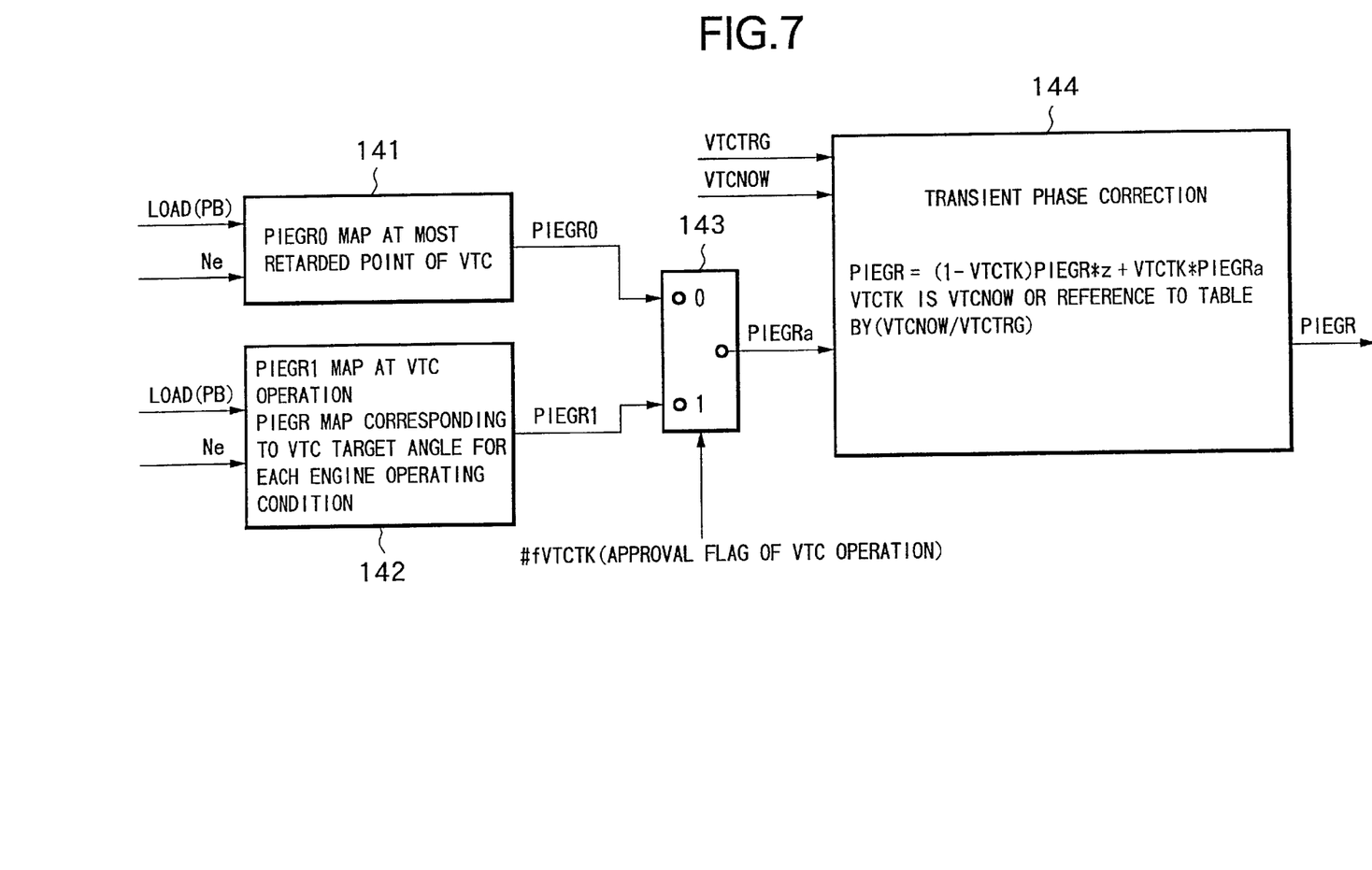
FIG. 7 is a block diagram showing a fifth embodiment of the correction calculation process based on a new air intake ratio.

In FIG. 7, a most retarded point correction value calculation unit 141 is provided with a most retarded map for, in advance, storing a new air intake efficiency correction value PIEGR0 at the most retarded point corresponding to the intake pressure PB and the engine rotation speed Ne. By referring to the most retarded point map, the new air intake efficiency correction value PIEGR0 corresponding to the intake pressure PB and the engine rotation speed Ne is retrieved.

On the other hand, a target advance amount based correction value calculation unit 142 is provided with a map for storing the new air intake efficiency correction value PIEGR1 corresponding to the target advance amount VTCTRG of variable valve operating apparatus 40 to be corresponding to the intake pressure PB and the engine rotation speed Ne, wherein by referring to the map, the new air intake efficiency correction value PIEGR1 corresponding to the intake pressure PB and the engine rotation speed Ne at that time is retrieved.

A correction value switching unit 143 is input with an operation approval flag #fVTCKT. In a state where the operation approval flag #FVTCKT is 1 and the operation of variable valve operating apparatus 40 is approved, the new air intake efficiency correction value PIEGR1 retrieved from the target advance point map is output as a correction value PIEGRa. In a state where the operation approval flag #fVTCKT is 0, and the operation of variable valve operating apparatus 40 is not approved but is held at the most retarded angle state, the new air intake efficiency correction value PIEGR0 retrieved from the most retarded point map is output as the correction value PIEGRa.

A transient phase correction unit 144 performs weighted averaging the correction value PIEGRa output from correction value switching unit 143, thereby correcting the phase delay to cope with a delay of the actual advance angle amount VTCNOW to the change in target advance amount VTCTRG, to obtain the correction value PIEGR corresponding to the actual advance amount VTCNOW.

To be specific, the correction value PIEGRa is weighted averaged according to the following equation.

$$PIEGR=(1-VTCKT)\times PIEGRz+VTCTK\times PIEGRa.$$

In the above equation, VTCTK is a value showing a weighting ratio, PIEGRz is a previous value of the weighted average value PIEGR. The weighting ratio VTCTK is set by referring to a table based on the actual advance amount VTCNOW or VTCNOW/VTCTRG showing the convergence ratio to the target.

According to the above construction, the correction value PIEGRa obtained corresponding to the target advance amount VTCTRG is weighted averaged, thereby obtaining the correction value PIEGR corresponding to the actual advance amount VTCNOW being changed in delay to the change in target advance amount VTCTRG. Since the correction value PIEGR corresponding to the actual advance amount VTCNOW is estimated in a primary delay system with respect to a stepwise change in target advance amount VTCTRG, when the change in correction value PIEGR to the advance amount is not linear, the correction value PIEGR corresponding to the actual advance amount VTCNOW can be obtained with high accuracy.

The entire contents of Japanese Patent Application No. 2000-245131 filed Aug. 11, 2000 and Japanese Patent Application No. 2000-245132 filed Aug. 11, 2000 are incorporated herein by reference.

What is claimed is:

1. An apparatus for controlling an internal combustion engine comprising:

a variable valve operating apparatus for changing opening and closing characteristics of intake valve and exhaust valves;

a pressure sensor for detecting an intake pressure in said engine;

a rotation sensor for detecting a rotation speed of said engine;

an opening and closing characteristic detection unit for detecting said opening and closing characteristics to be adjusted by said variable valve operating apparatus;

a new air intake ratio calculation unit for calculating a new air intake ratio of said engine based on said opening and closing characteristics of said intake and exhaust valves, said intake pressure and said rotation speed; and an operation factor calculation unit for calculating and outputting an operation factor of said engine based on said new air intake ratio calculated at said new air intake ratio calculation unit.

2. An apparatus for controlling an internal combustion engine according to claim 1, wherein said new air intake ratio calculation unit comprises:

a reference value calculation unit for calculating a reference new air intake ratio corresponding to reference opening and closing characteristics of said intake and exhaust valves based on said intake pressure and said rotation speed; and a correction unit for correcting said reference new air intake ratio in response to said opening and closing characteristics of said intake and exhaust valves to calculate said new air intake ratio.

3. An apparatus for controlling an internal combustion engine according to claim 2, wherein said reference value calculation unit comprises:

a reference value storage unit for storing, in advance, said reference new air intake ratio at said reference opening and closing characteristics corresponding to said intake pressure and said rotation speed; and a retrieval unit for retrieving said reference new air intake ratio corresponding to the intake pressure and the rotation speed at that time from said reference value storage unit.

4. An apparatus for controlling an internal combustion engine according to claim 1, wherein said new air intake ratio calculation unit comprises:

a storage unit for storing a plurality of maps each showing the new air intake ratio corresponding to said intake pressure and said rotation speed for each of said opening and closing characteristics; and an interpolation calculation unit for calculating the new air intake ratio corresponding to said opening and closing characteristics at that time by an interpolation calculation based on the new air intake ratios retrieved from said plurality of maps.

5. An apparatus for controlling an internal combustion engine according to claim 1, wherein said new air intake ratio calculation unit comprises:

a control target based calculation unit for calculating the new air intake ratio of said engine based on a control target of the opening and closing characteristics, the intake pressure and the rotation speed in said variable valve operating apparatus; and a response correction unit for performing a correction corresponding to a response delay in actual opening and closing characteristics to the control target, to the new air intake ratio calculated based on said control target, said intake pressure and said rotation speed.

6. An apparatus for controlling an internal combustion engine according to claim 5, wherein said response correction unit corrects said new air intake ratio based on a convergence ratio of said actual opening and closing characteristics to said control target.

7. An apparatus for controlling an internal combustion engine according to claim 5, wherein said response correction unit performs a correction to delay a phase of the new air intake ratio calculated based on said control target, said intake pressure and said rotation speed.

8. An apparatus for controlling an internal combustion engine according to claim 1, wherein said new air intake ratio calculation unit comprises:

a control target based calculation unit for calculating the new air intake ratio of said engine based on a control target of the opening and closing characteristics, the intake pressure and the engine rotation speed in said variable valve operating apparatus;

a reference value calculation unit for calculating a reference new air intake ratio corresponding to reference opening and closing characteristics in said variable valve operating apparatus based on the intake pressure and the engine rotation speed; and an interpolation calculation unit for calculating the new air intake ratio corresponding to actual opening and closing characteristics by an interpolation calculation based on the new air intake ratio calculated based on said control target, said intake pressure and said engine rotation speed, and said reference new air intake ratio.

9. An apparatus for controlling an internal combustion engine according to claim 8, wherein said reference value calculation unit sets the opening and closing characteristics in which said new air intake ratio reaches an inflection point to a change in opening and closing characteristics as said reference opening and closing characteristics.

10. An apparatus for controlling an internal combustion engine according to claim 8, wherein said reference value calculation unit sets the opening and closing characteristics in which said new air intake ratio reaches an extreme to a change in said opening and closing characteristics as said reference opening and closing characteristics.

11. An apparatus for controlling an internal combustion engine according to claim 1, wherein said new air intake ratio calculation unit comprises:

a control target based calculation unit for calculating the new air intake ratio of said engine based on a control target of the opening and closing characteristics, the intake pressure and the rotation speed of said variable valve operating apparatus; and a weighted averaging unit for weighted averaging the new air intake ratio calculated based on said control target, said intake pressure and said rotation speed.

12. An apparatus for controlling an internal combustion engine according to claim 11, wherein a weighting ratio setting unit is provided for setting a weighting ratio in said weighted averaging unit based on actual opening and closing characteristics.

13. An apparatus for controlling an internal combustion engine according to claim 11, wherein a weighting ratio setting unit is provided for setting a weighting ratio in said weighted averaging unit based on a convergence ratio of actual opening and closing characteristics to said control target.

14. An apparatus for controlling an internal combustion engine according to claim 1, wherein said variable valve operating apparatus changes opening and closing timing of said intake and exhaust valves, and said opening and closing characteristic detection unit detects said opening and closing timing.

15. An apparatus for controlling an internal combustion engine according to claim 1, further comprising a fuel injection valve for injecting fuel to said engine, wherein said operation factor calculation unit calculates a fuel injection quantity of said fuel injection valve as said operation factor and outputs a driving signal corresponding to said fuel injection quantity to said fuel injection valve.

16. An apparatus for controlling an internal combustion engine according to claim 1, further comprising an ignition apparatus for spark igniting air-fuel mixture of a combustion chamber in said engine, wherein said operation factor calculation unit calculates ignition timing of said ignition apparatus as said operation factor and outputs an ignition signal corresponding to said ignition timing.

17. An apparatus for controlling an internal combustion engine comprising:

variable valve operating means for changing opening and closing characteristics of intake valve and exhaust valves;

pressure detecting means for detecting an intake pressure in said engine;

rotation speed detecting means for detecting a rotation speed of said engine;

opening and closing characteristic detecting means for detecting said opening and closing characteristics to be adjusted by said variable valve operating means;

new air intake ratio calculating means for calculating a new air intake ratio of said engine based on said opening and closing characteristics of said intake and exhaust valves, said intake pressure and said rotation speed; and operation factor calculating means for calculating and outputting an operation factor of said engine based on said new air intake ratio calculated at said new air intake ratio calculating means.

18. A method for controlling an internal combustion engine provided with a variable valve operating apparatus for changing opening and closing characteristics of intake valve and exhaust valves, comprising the steps of:

detecting an intake pressure in said engine;

detecting a rotation speed of said engine;

detecting said opening and closing characteristics to be adjusted by said variable valve operating apparatus;

calculating a new air intake ratio of said engine based on said opening and closing characteristics of said intake and exhaust valves, said intake pressure and said rotation speed; and calculating and outputting an operation factor of said engine based on said new air intake ratio calculated at said new air intake ratio calculation unit.

19. A method for controlling an internal combustion engine according to claim 18, wherein said new air intake ratio calculating step comprises the steps of:

calculating a reference new air intake ratio corresponding to reference opening and closing characteristics in said variable valve operating apparatus; and correcting said reference new air intake ratio in response to actual opening and closing characteristics in said variable valve operating apparatus to calculate said new air intake ratio.

20. A method for controlling an internal combustion engine according to claim 18, wherein said new air intake ratio calculating step comprises the steps of:

calculating the new air intake ratio of said engine based on a control target of the opening and closing characteristics, the intake pressure and the rotation speed in said variable valve operating apparatus; and performing a correction corresponding to a response delay in actual opening and closing characteristics to the control target, to the new air intake ratio calculated based on said control target, said intake pressure and said rotation speed.

* * * * *